United States Patent [19]
Komori

[11] 3,743,274
[45] July 3, 1973

[54] DRIVE MECHANISM FOR COPYING MACHINE

[75] Inventor: Shigehiro Komori, Yokohama, Japan

[73] Assignee: Canon Camera Kabushiki Kaisha, Tokyo, Japan

[22] Filed: Apr. 15, 1971

[21] Appl. No.: 134,140

Related U.S. Application Data

[63] Continuation-in-part of Ser. No. 784,436, Dec. 17, 1968, abandoned, and a continuation-in-part of Ser. No. 794,153, Jan. 27, 1969, Pat. No. 3,620,620.

[30] Foreign Application Priority Data
Dec. 31, 1967  Japan................................. 42/187
Jan. 31, 1968  Japan............................... 43/6133

[52] U.S. Cl................. 271/3, 74/661, 271/51, 355/8
[51] Int. Cl........................ B65h 5/06, B65h 29/20
[58] Field of Search ...................... 271/3, 4, 8, 51, 271/54; 355/8; 74/661, 722

[56] References Cited
UNITED STATES PATENTS

| 3,486,819 | 12/1969 | Di Giulio | 355/8 X |
|---|---|---|---|
| 2,424,989 | 8/1947 | Koepfer | 95/12.5 |
| 2,356,590 | 8/1944 | Jacobsen | 74/661 |
| 3,438,706 | 4/1969 | Tanaka et al. | 355/8 X |
| 3,533,784 | 10/1970 | Granzow et al. | 355/8 X |

Primary Examiner—Evon C. Blunk
Assistant Examiner—Bruce H. Stoner, Jr.
Attorney—Raymond J. McElhannon, John Thomas Cella et al.

[57] ABSTRACT

The present invention relates to a drive mechanism for a copying machine provided with a reciprocating feed board which comprises a continuous drive mechanism and an intermittent drive mechanism which is only driven during the copying operation and means for interlocking both drive mechanisms for preventing the occurrence of an error in paper and original feed speed between these drive mechanisms.

4 Claims, 11 Drawing Figures

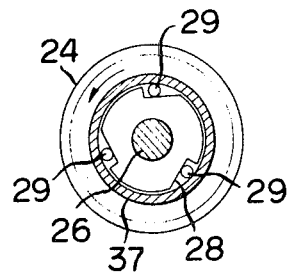
FIG. 3
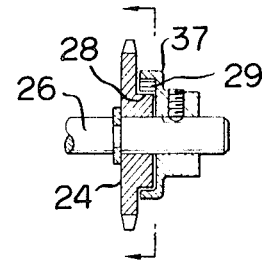
FIG. 4
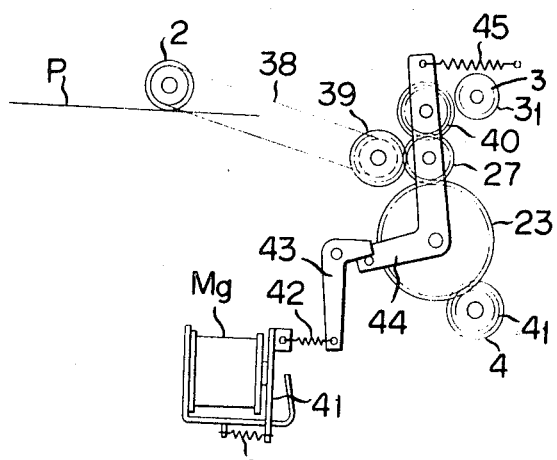
FIG. 5
FIG. 6

DRIVE MECHANISM FOR COPYING MACHINE

This application is a continuation-in-part application of my copending application Ser. No. 784,436 filed Dec. 17, 1968 now abandoned and my copending application Ser. No. 794,153 filed Jan. 27, 1969, now U.S. Pat. No. 3,620,620.

This invention relates to drive mechanisms and, more particularly, to drive mechanisms for a copying machine provided with a reciprocating feed board.

It is an object of the present invention to provide a drive mechanism for a copying machine provided with a reciprocating feed board that comprises a continuous drive mechanism which is invariably driven as long as the main switch is in on position, and an intermittent drive mechanism which is driven only during copying operation and will prevent the occurrence of an error in paper feed speed between these drive mechanisms by effectively interlocking them.

Another object is to provide a drive mechanism that is extremely simple in construction.

These and other objects and advantages of the present invention will become apparent from the following description taken in connection with the accompanying drawing, wherein:

FIGS. 3 and 4 are enlarged front and side views of a unidirectional transmission mechanism that forms a part of the drive mechanism;

FIG. 5 is a front view of a clutch for a feed roller;

FIG. 6 shows a side elevational view of a second embodiment in which a reversibly rotatable motor is used;

Figure 1:
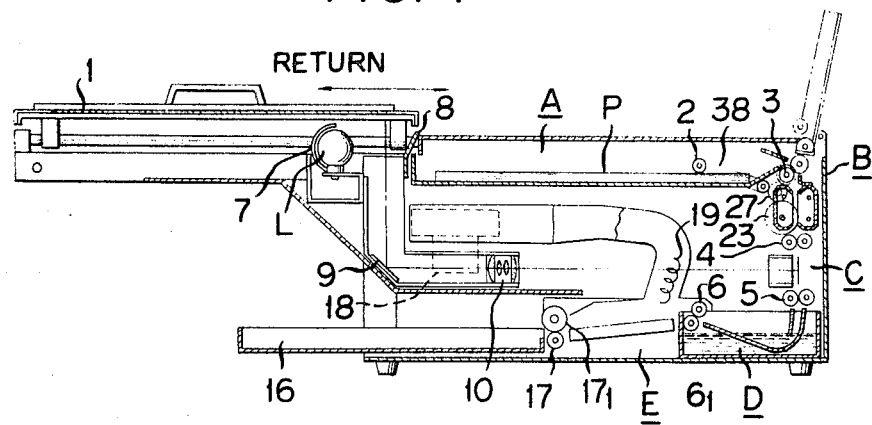
FIG. 1 is a side elevational view showing a first embodiment of the copying machine provided with the reciprocating feed board made in accordance with the present invention.

Referring now to the drawings, and more particularly to FIG. 1 thereof, in an electrophotographic copying machine with a reciprocating feed board, a feed board 1 is designed to reciprocate, and during its forward movement to the right, as viewed in FIG. 1, to the predetermined end of its stroke, a feed roller 2 in a paper feed section A, a feed roller 3 in a charged section B, and feed rollers 4 and 5 in an exposure section C rotate simultaneously to feed sensitive paper P to the inlet of the exposure section C through the charged section B, the circuit of which is closed to discharge corona.

The above-mentioned rollers continue to rotate after the movement of the feed board 1 has been reversed, passing the sensitive paper from the exposure section C to the development section D, where the leading end of the sensitive paper reaches a paper squeeze and delivery roller 6.

During this returning motion of the feed board, a lamp L is lit. The light of this lamp is reflected by reflectors 7 and 8 to give light from below to a master copy on the feed board glass 1. The image to be reproduced is then reflected by a mirror 9 to pass through a group of projection lenses 10 which, through a slit, projects the image onto the sensitive paper in the exposure section C. The feed board 1 stops when it has reached the end of its return stroke; the lamp L is turned off and the rollers 2 through 5 stop rotating to stop feeding and delivering the paper, and the charged section B stops corona discharge.

Figure 11:
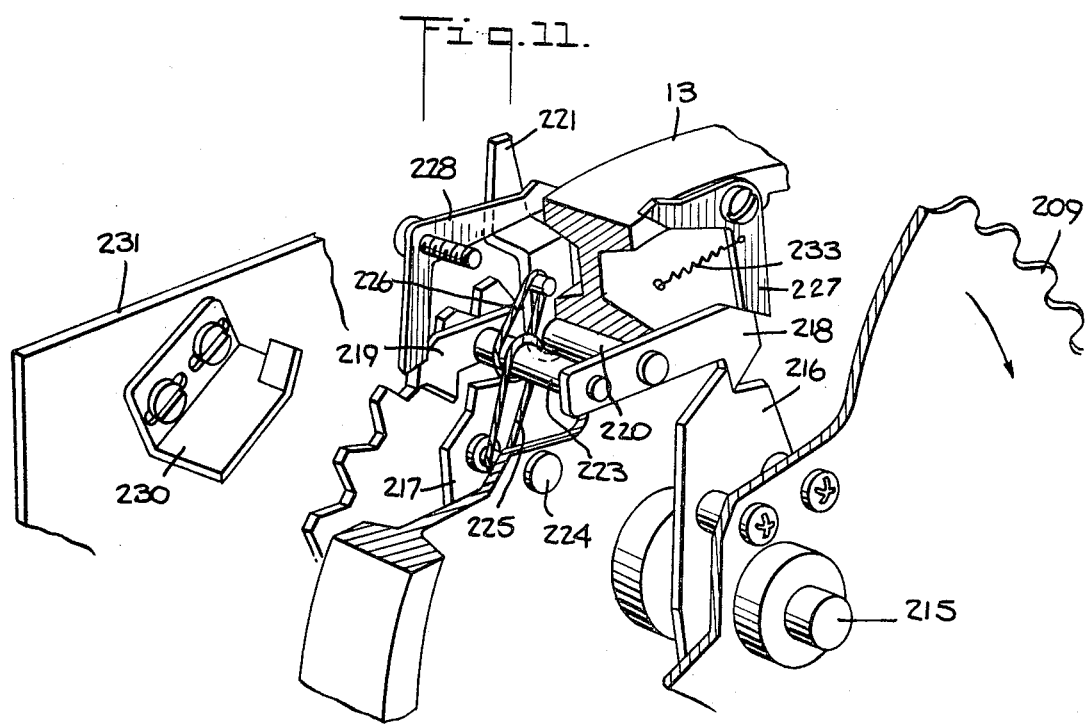
FIG. 11 is a perspective view of the mechanism of FIG. 10.

The feed board 1 is reciprocatingly driven by power from a motor $M_2$ through power transmission mechanisms 11 and 12, from which the power is transmitted to a feed board drive pulley 13 and further to a known reversible feed board driven pulley through a belt 14. For example, as seen in FIGS. 10 and 11, 209 and 210 show toothed wheels loosely fitted over a common shaft 215. One toothed wheel 209 is in mesh with a toothed wheel 211 carried by the drive shaft 50 and is caused to rotate in a clockwise direction. The other toothed wheel 210 is coupled to a toothed wheel 212 carried by the drive shaft 50 through an idle gear 213 and is rotated in the direction opposed to the direction of rotation of the toothed wheel 209. Reference numeral 13 designates a reciprocating rotary drum or pulley carried by the common shaft 215 and disposed between the toothed wheels 209 and 210. Driving pawls 216 and 217 are fixed to the toothed wheels 209 and 210, respectively, in opposed relation with the rotary drum 13. Driven or follower pawls 218 and 219 in the form of levers attached to the ends of a pin 220 extend through the rotary drum 13, respectively, in such a manner that when the driving pawl 216 engages with the driven or follower pawl 218, the driving pawl 217 is disengaged from the driven or follower pawl 219 and vice versa, thereby constructing a seesaw mechanism. A coiled spring 225 is loaded between a pin 224 extending from the rotary drum 13 and another pin 223 interconnecting the driven or follower pawls 218 and 219 so that normally the pawl 216 is released from the driven or follower pawl 218 while the pawl 217 is in engagement with the driven or follower pawl 219. Reference numeral 221 designates a changeover or reversing lever loosely attached to the pin 220 of the driven or follower pawls 218 and 219 and between the lever 221 and the pin 223 is loaded a coiled spring 226 stronger than the spring 225. Reference numerals 227 and 228 designate stoppers, respectively, which serve for securing the engagement of the driven or follower pawls 218 and 219 with the driver pawls 216 and 217, respectively. The stoppers 227 and 228 are pivoted to the rotary drum 13. Reference numeral 230 designates actuating or release elements (only one shown) disposed on the sides of a machine frame 231 for releasing the actuation of the stoppers 227 and 228. The actuating element 230 is also adapted to actuate the changeover lever 221. With the device having the construction and arrangement as described hereinbefore, the mode of operation will be described hereinafter. FIG. 11 illustrates the state in which the motor $M_2$ is driven so as to rotate the toothed wheels 209 and 210 in the opposite directions with each other; and the driving pawl 216 engages with the driven or follower pawl 218 so that the reciprocating rotary drum or pulley 13 is rotated together with the toothed wheel 209, whereby the belt 14 is wound around the pulley, thereby causing the return movement of the feed board 1. In this case, the driven or follower pawl 218 is held in its operative position so as to engage with the driving pawl 216 by means of the stopper 227 against the spring 225. At the end of the return stroke in the preceding step, the stopper 227 is actuated by the actuating or releasing element (not shown but similar to 230) disposed upon the machine frame 31 so that the stopper 227 is caused to rotate against the spring 233, thereby releasing the driven or follower pawl 218. The pawl 218, therefore, is caused to rotate by the coiled spring 225, thereby disengaging from the driving pawl 216, whereby the transmission of the rotation to the rotary drum 13 is ceased. Immediately after the above operation, toothed wheels 209 and 210 are stopped, i.e. the feed board 1, is stopped temporarily at the left side in FIG. 1, whereby the replacement of originals. etc., may be effected. In this case, the driven or follower pawl 219 is caused to rotate in the counterclockwise direction in FIG. 4 together with the pawl 218 and is advanced to a position where the driven or follower pawl 219 can engage with the driving pawl 217. Upon depressing a starting button again, the device is driven so that the rotation of the pulley 13 by the toothed wheel 210 rotating in the counterclockwise direction is started, whereby the feed board 1 is driven into the forward stroke. Immediately before the feed board 1 reaches the end of its forward stroke, the changeover lever 221 is actuated by the actuating or release element 230 so that the lever 221 has a tendency to switch the engagement of the driven pawl 219 to that of the pawl 218 through the coiled spring 226 and the pin 223. But since the driven or follower pawl 219 is held in position by means of the stopper 228, the changeover lever 221 is only allowed to extend the spring 226 a limited extent while the energy is being stored or accumulated in the coiled spring 226. The rotation of the pulley 13 is therefore further permitted until the feed board 1 reaches the end of its forward stroke. The stopper 228 is pushed down by the actuating or release element 230, thus releasing the driven or follower pawl 219. At this instant, the coiled spring 226 overcomes the spring 225 so that the engagement of the driven or follower pawl 219 is switched to that of the pawl 218. In this case, the driving pawl 216 extending from the toothed wheel 209 is just in a position for engagement with the driven or follower pawl 218 so that the device is immediately switched to the return stroke. That is, the feed board 1 immediately starts its return stroke.

All of such operations as the reciprocal motion of the feed board 1, the rotation and stop of the rollers 2 through 5, the operation of the lamp L, and the supply and stop of electric power to the charged section B, can be controlled intermittently through a group of cams 15 installed in engagement with the feed board drive pulley 13 by operating a microswitch group MS located on the machine.

Beside this intermittent drive mechanism, a continuous drive mechanism comprising a motor for a developer stirring pump in the development section D, the squeeze and delivery roller 6, a motor $M_1$ for driving a delivery roller 17 for delivering the sensitive paper out to a tray 16, a motor 18 for a blower for supplying the warm air from around the lamp L to a drying section E, and a heater 19, is necessary.

The paper delivery speed of both the aforementioned continuous delivery rollers 6 and 17 and the intermittent delivery rollers 2 through 5 must invariably be uniform without any error; otherwise the paper will become too slack or too tight in the development section.

To prevent this, in a conventional art, the motor $M_1$ for driving the continuous feed rollers 6 and 17 was commonly used to drive the intermittent feed rollers 2 through 5; and within the transmission mechanism was installed an electromagnetic clutch to interrupt the flow of power from the motor.

This conventional mechanism has shortcomings such as the mechanism is of complicated construction and, moreover, an error in the feed speed occurs due to wear of an unnecessarily large capacity motor, clutch and control mechanism at the time of stopping the intermittent drive mechanism.

The present invention has overcome all of these shortcomings. Namely, the paper delivery rollers 6 and 17 in the continuous drive section and the intermittent feed rollers 2 through 5 which are driven during copying process only, are driven by the motors $M_1$ and $M_2$, respectively. Both drive mechanisms are interlocked effectively by an overriding or unidirectional clutch mechanism, and the feed speed of the continuous drive mechanism is adjusted slightly slower than that of the intermittent drive mechanism so that when connected to the continuous drive mechanism, the intermittent drive mechanism can be driven through the clutch mechanism at the same speed as the continuous drive mechanism. That is, the clutch will transmit power when the driver is rotating in one direction but will automatically release when the driven shaft is rotating faster than the driving member.

The continuously driven delivery rollers 6 and 17 are driven by the motor $M_1$ through gears 20 and 21 and a belt 22, while the intermittently driven rollers 4 and 5 are driven by the motor $M_2$ through gears 11 and 12 and a belt 25. The roller 2 is driven through the roller 4, intermediate gears 23 and 27 and a belt 38, while the roller 3 is driven through the gear 23, and the intermediate gears 27 and 40.

The clutch mechanism is installed on the shaft 26 of the aforementioned delivery roller 6 or, as described later, install on guide roller shaft 50 on which the belt 25 is mounted and is driven by a belt or a chain 22. For example, as shown in FIGS. 3 and 4, the frictional pulley, or sprocket 24, on which the belt 25 is mounted is loosely installed on the shaft 26 and between this pulley or sprocket and a clutch disk 37, fixed on the shaft 26, is formed a roller clutch which consists of a cam ring 28 and rollers 29 or balls. The pockets for the rollers 29 are slightly tapered as clearly seen in FIG. 3 and when the speed of rotation of the shaft 26 is greater than the speed of rotation of the sprocket 24 the rollers are forced to the large end of the pockets so that the shaft 26 can rotate without driving the sprocket 24. When the speed of rotation of the sprocket 24 is greater than the speed of rotation of the shaft 26, friction causes the rollers to wedge between the two members so that both members move as a single unit.

Figure 2:
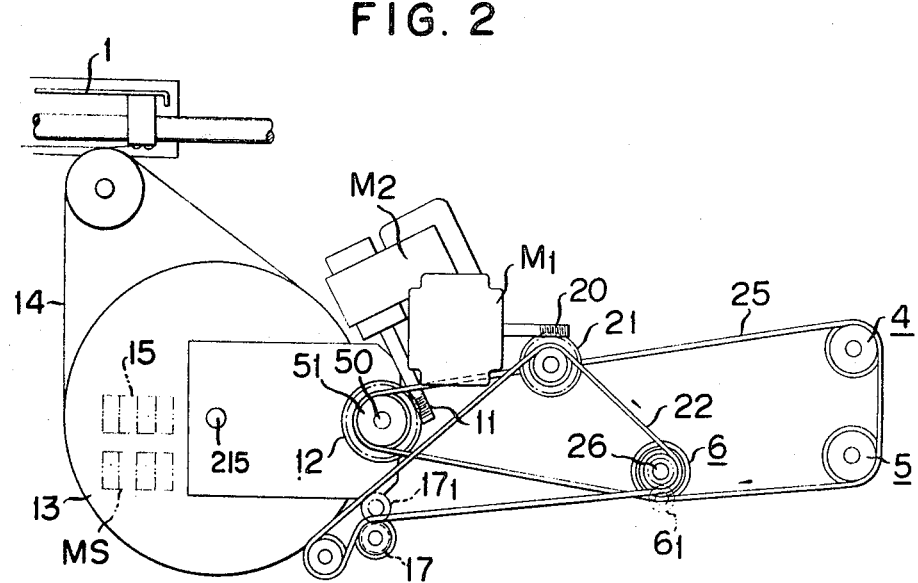
FIG. 2 is an enlarged schematic side elevational view of the drive mechanism for the present invention.

When the intermittent drive mechanism is stopped, the shaft 26, the delivery roller 6 and the clutch disk 37 rotate counterclockwise in FIG. 3 (clockwise in FIG. 2) regardless of the fact that the sprocket 24 and the cam ring 28 have stopped, for drawing up the sensitive paper from the development section D and sending the paper to the drying section E.

As the intermittent drive mechanism is actuated, the sprocket 24 and the cam ring 28 rotate in the same direction at a higher rate than the aforementioned continuous feed speed, and accordingly, the sprocket 24 and the shaft 26 are connected into a unitary structure and the entire mechanism is driven at an intermediate speed of the two speeds, respectively, which the motors would otherwise be operating at if driven separately. Therefore, the motors $M_1$ and $M_2$ will operate at points on their respective torque speed curves to share the load in such a manner that their speeds will be equal, and the feed speed for feeding the paper from the feed section A to the development section D and the delivery speed for sending the paper out from the development section to the discharge section 16 are equal and synchronized.

The clutch mechanism described above employs, beside the illustrated mechanism, a coil grip friction clutch using a coil spring or other conventional mechanism having the same effect.

The above example shows the clutch mechanism having both the belt 22 for the continuous drive and the belt 25 for the intermittent drive mounted on the shaft 26. This mechanism may be located between an output shaft 50 which is driven with a reduced speed by the intermittent drive motor $M_2$ through the gears 11 and 12 and a transmission ring 51 on the output shaft 50 on which the belt 25 for intermittent drive is mounted and the sprocket ring 24 may be securely fixed on the shaft 26.

When the feed board 1 is at a stop, the feed rollers 4 and 5 are always driven by the continuous drive mechanism through the sprocket ring 24. When the feed board is driven, the transmission ring 51 is moved by the reversible mechanism into engagement with the shaft 50 which is rotating at a high speed and all of the rollers 4, 5, 6 and 17 rotate at a medium, constant speed of the two drive mechanisms and the speed of the feed board, i.e. the master copy, and the travelling speed of the sensitive paper are properly synchronized.

As stated before, the sensitive paper P moves to the exposure section C until the feed board 1 reaches the end of its rightward forward stroke and, on the return stroke, exposure is done at once. During this cycle, the feed roller 2 moves the sensitive paper P as far as the feed roller 3. Consequently, the feed roller 2 has an intermittent motion different from the other feed rollers. The clutch mechanism is illustrated in FIG. 5.

When the feed roller 2 is driven with the power from the motor $M_2$ through the gear $4_1$ on the shaft of the feed roller 4, the gears 23, 27 and 39, and the belt 38, and the paper P passes around the roller 3, the clutch arm 44 which supports the intermediate gear 27, the gear 40 in constant engagement with the gear 27 and the gear 40 is pulled to the right by the action of a spring 45 shown in FIG. 5 to move the gear 27 out of engagement with the gear 39 and to move the gear 40 into engagement with the gear 31 on the same axis of the roller 3, disconnecting the flow of power to the feed roller 2 and connecting the power to the feed roller 3. The movement of the clutch arm 44 is controlled by means of one of the microswitches through the group of cams 15 on the above-mentioned feed board drive pulley 13. That is, when the flow of power to the electromagnet Mg which corresponds to paper plunger PP in the circuit is controlled in interlock with the movement of the feed board 1, a contact arm 41 is actuated to pull or release the lever 43 through a spring 42, moving the clutch arm 44.

Figure 7:
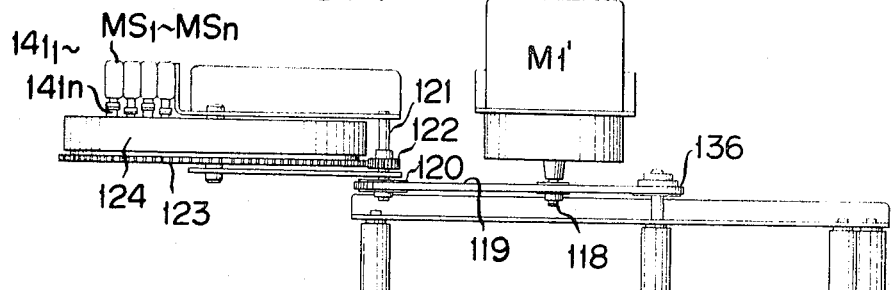
FIG. 7 shows a plan view of the second embodiment.

Referring to FIGS. 6 through 9, the second embodiment is explained. As explained before, the feed board 103 should be reciprocatingly moved and in its backward movement the phototaking is made. Moreover, the board should be stopped for changing the master copy, the board is to be intermittently moved, while the exposed photosensitive paper is successively fed after being photocopied to the development section D and drying section E by means of the constant drive mechanism. For this purpose, in this second embodiment, as shown in FIGS. 6 and 7, a reversibly rotatable motor $M_1'$ is used, and its driving force is transmitted from its output shaft 118 to a driven shaft 124' through belt 119, pulley 120 (or chain and chain wheel), shaft 121, small gear 122 and large gear 123, and the driving force is further transmitted from the gear 124 to the feed board through belt 125 and guide roller 126, both ends of the belt 125 being connected to the both ends of the feed board, respectively. The forward movement of the feed board 1 is made by the normal directional rotation of the motor $M_1'$ and at the end of the forward movement a microswitch is actuated to reversibly rotate the motor $M_1'$ to return the feed board to its initial position. When the board reaches the initial position the board is stopped by means of a switch. In this second embodiment, the changeover of the movement of the board to the forward or backward direction is operated by the switchover of the circuit of the reversibly rotatable motor, so that the mechanism is simpler than the first embodiment. The paper feed rollers 2, 3, 110 and 11 are driven constantly by the motor $M_2'$ through reduction gears 128 and 129, shaft 130 and belt 127 around the pulley $130_1$. The operation of the rollers 2 and 3 as driven by roller 110 is almost the same as in the first embodiment as shown in FIG. 5. Thus, all of the paper feed rollers 2, 3, 110 and 111 are rotated by the common belt 127, thereby providing a simple transmission mechanism which assures proper feed speed of the paper passing from the charging section A to the tray 16.

However, although the paper feed speed of these rollers and the master feed speed of the feed board to be driven intermittently should be the same speed, there is a fear of producing error due to the use of separate motors having small capacity. Therefore in this second embodiment, the intermittent drive mechanism and continuous drive mechanism are interconnected by a clutch mechanism as described before regarding the first embodiment.

Figure 8:
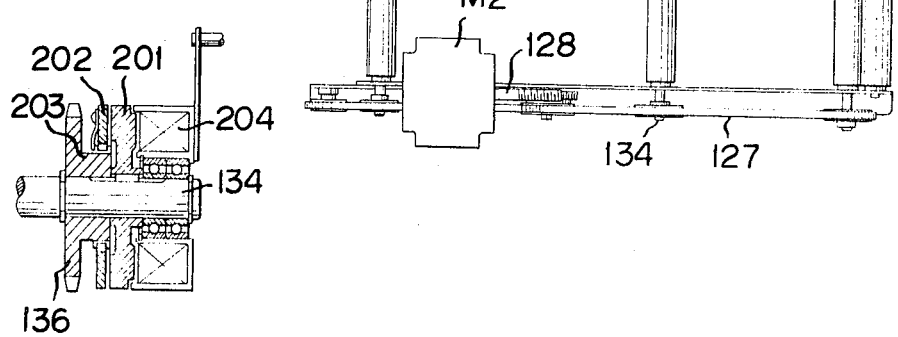
FIG. 8 is an enlarged medial sectional view showing a magnetic clutch used for the invention in place of the clutch shown in FIGS. 3 and 4.

This embodiment shown especially in FIG. 6 is explained referring to the first embodiment as shown in FIGS. 3 and 4. When said intermittent drive mechanism is stopped, shaft 134 (26 in FIGS. 3 and 4), roller 6 and clutch disk 37 are rotated in the normal direction regardless of whether or not the sprocket 136 (24 in FIGS. 3 and 4) and cam ring 28 are running, for picking up the sensitive paper from the development section D and sending it to the drying section E. The shaft 134 is also freely rotating in the normal direction with the aid of the one-way clutch means when the sprocket 136, which corresponds to the sprocket 24 in FIG. 3, rotates in a counterclockwise direction by means of belt 119 in the same manner as in the embodiment of FIG. 3. Consequently, under the above-mentioned operating conditions, the intermittent drive mechanism ($M_1'$ and 119 system) and the continuous drive mechanism ($M_2'$ and 127 system) are activated independently from each other. When the intermittent drive mechanism is activated and the sprocket 136 (24 in FIG. 3) rotates in the clockwise direction, the one-way clutch connects the sprocket 136 (24) and cam ring 28 to the shaft 134 (26) and the clutch disk 37 through the rollers 29. In this case, the intermittent drive mechanism and the continuous mechanism are synchronized at the coupled position and operate at a speed intermediate of the two speeds, respectively, which they would otherwise operate at if driven separately, so as to synchronize the feed speed of the feed board 1 and the sensitive paper when an exposure is being made. However, for the clutch mechanism, a magnetic clutch shown in FIG. 8 is advantageously used, which includes a rotor 210 fixedly mounted on a shaft 134, and an armature 202 coupled by a spline to armature hub 203, which is integrally formed with the belt wheel 136, around which the belt is wound. When only the continuous driving system is driven, the armature hub 203 is stopped and the rotor 201 is rotated to feed paper regardless of the intermittent drive mechanism. When the intermittent drive mechanism is operated in the backward movement of the feed board, the magnetic clutch is actuated to energize the magnet 204 so that the rotor 201 and the armature 202 are coupled to couple the shaft 134 and armature hub 203 to drive both drive mechanisms at the same speed.

Figure 9:
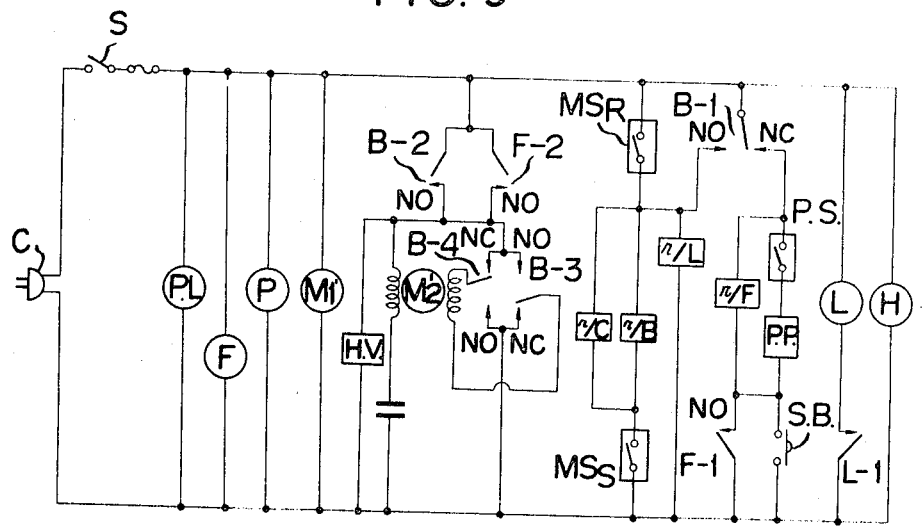
FIG. 9 shows an electric circuit used for the second embodiment.
Figure 10:
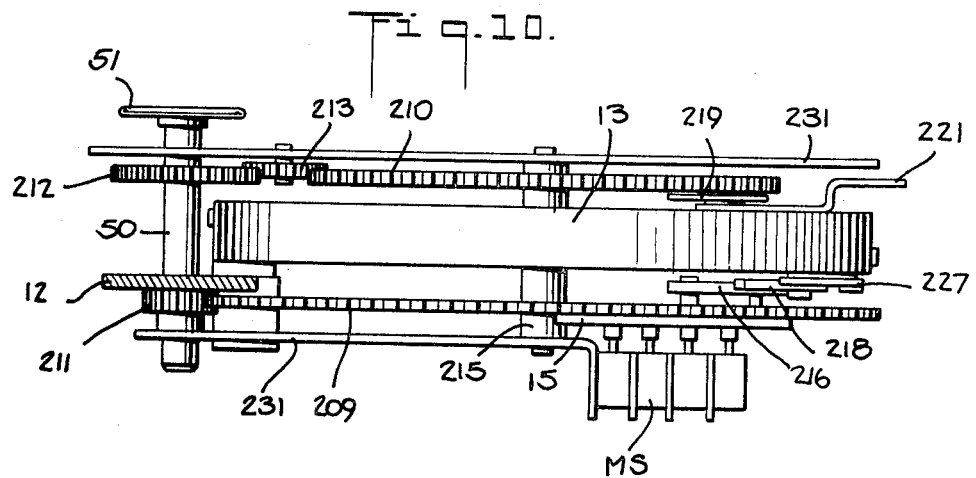
FIG. 10 is a plan view of the reciprocating motion reversing mechanism of the embodiment of FIGS. 1–5.

In FIG. 9 the circuit for the second embodiment is shown, in which C is an electrical connection, S is a switch, P.L. is a pilot lamp, F is a cooling fan, P is a pump for stirring the developing liquid, $M_1'$ is a motor for driving the constant drive mechanism, $M_2'$ is a motor for driving the intermittent drive mechanism, r/F, r/L, r/C and r/B are the relays for forward movement, for lamp, for the magnet clutch and for the backward movement, respectively: $MS_R$ is a microswitch for reversing the movement of the feed board; $MS_S$ is a microswitch for stop; magnetic clutch r/c is used for interconnecting the intermittent and constant drive mechanism but should be omitted when reversible mechanism is used; P.S. is a paper feed switch and P.P. is a paper plunger; L is an exposure lamp lit in the backward movement step; and H is a heater.

When connection C is connected to an electric source and switch S is on, pilot lamp P.L., fan F, developing liquid stirring pump and the motor $M_1'$ and the heater are switched on, and when push button S.B. is depressed the forward relay r/F is operated so as to energize the F-1, F-2, and the forward movement of the feed board is effected by the intermittent feed motor $M_2'$ and the paper feed plunger is also actuated. When the board reaches the reverse microswitch it is operated so as to actuate the reverse relay to energize B-1, B-2, B-3 and B-4 so that the intermittent drive motor $M_2'$ is operated to move the feed board backwardly.

I claim:
1. A drive mechanism for a copying machine having a reciprocating feed board for carrying an original to be copied, said mechanism comprising a continuous paper drive mechanism, an intermittent drive mechanism, a one way clutch having a first assembly for driving said continuous paper drive mechanism, first motor means for driving said first assembly, said clutch having a second assembly for driving said intermittent drive mechanism, second motor means for driving said second assembly, said first assembly being driveable by said first motor means independently of said second assembly, and said first assembly receiving driving power from said second assembly when the rotational speed of said second assembly in a selected direction exceeds the rotational speed of said first assembly in the same direction to drive said continuous paper drive mechanism and said intermittent drive mechanism at synchronous speed by said two motor means.

2. A drive mechanism for a copying machine having a reciprocating feed board for carrying an original to be copied according to claim 1 wherein said first assembly includes a clutch disk fixedly mounted on a shaft, and said second assembly includes a friction sprocket loosely mounted on said shaft and carrying a cam ring on the periphery thereof adjacent said clutch disk, and rollers being interposed between said clutch disk and said cam ring.

3. A drive mechanism for a copying machine having a reciprocating feed board for carrying an original to be copied according to claim 1 wherein said continuous paper drive mechanism drives a paper delivery roller in a development section and a delivery roller for delivering sensitive paper out to a tray in said copying machine, and wherein said intermittent drive mechanism drives said reciprocating feed board and a series of paper feed rollers in a paper feed section, in a charged section and in an exposure section in said copying machine.

4. A drive mechanism for a copying machine having a reciprocating feed board for carrying an original to be copied according to claim 1 wherein said second motor means is a reversibly rotatable motor for driving said intermittent drive mechanism in both directions.

* * * * *